(12) United States Patent
Üstünberk

(10) Patent No.: US 11,279,273 B1
(45) Date of Patent: Mar. 22, 2022

(54) SMART COVER FOR A VEHICLE SEAT AND VEHICLE SEAT COMPRISING SUCH SMART COVER

(71) Applicant: MARTUR ITALY S.R.L., Milan (IT)

(72) Inventor: Can Üstünberk, Grugliasco (IT)

(73) Assignee: MARTUR ITALY S.R.L., Milan (IT)

( * ) Notice: Subject to any disclaimer, the term of this patent is extended or adjusted under 35 U.S.C. 154(b) by 0 days.

(21) Appl. No.: 17/424,569

(22) PCT Filed: Nov. 16, 2020

(86) PCT No.: PCT/IB2020/060755
§ 371 (c)(1),
(2) Date: Jul. 21, 2021

(87) PCT Pub. No.: WO2021/099912
PCT Pub. Date: May 27, 2021

(30) Foreign Application Priority Data

Nov. 22, 2019 (IT) .................. 102019000021993

(51) Int. Cl.
*B60N 2/58* (2006.01)
*G01K 7/16* (2006.01)
*G01L 1/18* (2006.01)

(52) U.S. Cl.
CPC .............. *B60N 2/58* (2013.01); *G01K 7/16* (2013.01); *G01L 1/18* (2013.01)

(58) Field of Classification Search
CPC ............... B60N 2/58; G01K 7/16; G01L 1/18
See application file for complete search history.

(56) References Cited

U.S. PATENT DOCUMENTS

| 6,506,153 B1* | 1/2003 | Littek ................. A61B 5/0205 600/301 |
| 7,219,923 B2* | 5/2007 | Fujita .................... B60N 2/002 280/735 |
| 10,034,631 B1 | 7/2018 | Gallagher et al. |
| 10,730,524 B2* | 8/2020 | Frye ..................... A61B 5/6893 |

(Continued)

FOREIGN PATENT DOCUMENTS

| DE | 202012001096 U1 | 5/2012 |
| DE | 102014117758 A1 | 6/2016 |
| WO | 2015/127193 A1 | 8/2015 |

OTHER PUBLICATIONS

International Search Report and Written Opinion of the International Searching Authority issued for International PCT Application No. PCT/IB2020/060755 dated Mar. 24, 2021.

*Primary Examiner* — Kyung S Lee
(74) *Attorney, Agent, or Firm* — Howson & Howson LLP

(57) ABSTRACT

A smart cover for a vehicle seat is provided that is able to detect biometric data of the user occupying the vehicle seat. A vehicle seat comprising the cover is also provided. The vehicle seat cover comprises one or more yarn sensors and one or more yarn supercapacitors. The yarn supercapacitors are being electrically connected to the yarn sensors for powering them. Accordingly, an arrangement for the detection of biometric data of the user occupying the vehicle seat is provided with the arrangement being integrated in the cover of the seat. As a result, the provision of the biometric data detection arrangement does not adversely affect the production time and complexity nor the overall weight of the cover of the vehicle seat.

20 Claims, 2 Drawing Sheets

(56) References Cited

U.S. PATENT DOCUMENTS

| | | | |
|---|---|---|---|
| 2012/0078123 A1* | 3/2012 | Futatsuyama | A61B 5/318 600/485 |
| 2012/0212353 A1* | 8/2012 | Fung | B60W 10/18 340/905 |
| 2013/0070043 A1* | 3/2013 | Geva | B60K 28/066 348/14.02 |
| 2014/0039330 A1* | 2/2014 | Seo | A61B 5/6893 600/509 |
| 2015/0266405 A1* | 9/2015 | Fitzpatrick | B60N 2/5692 297/180.12 |
| 2016/0278709 A1* | 9/2016 | Ridao Granado | G01L 1/205 |
| 2019/0120607 A1 | 4/2019 | Veca et al. | |

* cited by examiner

US 11,279,273 B1

SMART COVER FOR A VEHICLE SEAT AND VEHICLE SEAT COMPRISING SUCH SMART COVER

TECHNICAL FIELD OF THE INVENTION

The present invention relates to a smart cover for a vehicle seat, said smart cover allowing detecting one or more biometric data of the user occupying the vehicle seat.

The present invention further relates to a vehicle seat comprising such smart cover.

The invention can advantageously allow monitoring the tiredness, and more generally the physical conditions, of a user driving a vehicle.

BACKGROUND ART

In the vehicle sector, particularly in the motor vehicle sector, increasing attention is being paid to safety, and in particular to accident prevention.

In this respect, there are numerous documents relating to arrangements for detecting a drowsy driving condition of a user.

These arrangements are generally based on the user's posture detection (e.g. head or eye position detection) and are designed to emit an alarm signal if the detected posture corresponds to a drowsy state.

However, these arrangements have clear limitations.

First of all, they intervene late, when the so-called "sudden-onset sleep" has already occurred. Consequently, the user has a limited reaction time to avoid a possible accident.

Secondly, they can give rise to false alarms, if a user who is fully awake and alert inadvertently assumes a posture that is recognized by the arrangement as a sleepiness-related posture.

Thirdly, such arrangements can only detect a change in the user's posture due to drowsiness, but are unable to detect other risk factors that could lead to an accident, such as stress, anxiety, breathlessness, and so on.

Therefore, in recent times attempts have been made to develop solutions capable of monitoring an increasing number of physical states of a user with greater precision through the detection of biometric data.

A possible solution is to equip a vehicle seat (or more generally some other element in the vehicle cockpit) with electrodes that the user can apply to his/her skin in order to obtain an electrocardiogram.

However, it is clear that this solution is extremely uncomfortable and difficult to implement.

Alternative solutions have thus been developed, which involve equipping a vehicle seat with means of collecting biometric data from a user without direct physical contact.

Such biometric data may include, for example, heart rate, blood pressure, breathing rate, body temperature and so on.

Generally, these solutions involve the use of detection arrangements that include piezoelectric sensors positioned inside the vehicle seat in respective positions corresponding to anatomical positions of a user sitting on the seat: the piezoelectric sensors generate an electrical signal in response to the mechanical stress applied to the sensors by the user and caused by physiological factors.

For example, breathing and the consequent expansion/contraction of the user's ribcage induce pressure on these sensors and consequent mechanical deformation of the sensors.

The mechanical deformations are transduced by the piezoelectric sensors into electrical signals, which can then be re-processed to deduce the user's breathing rate.

In this way, the piezoelectric sensors are able to detect a mechanical stress caused by a physiological state of the user without necessarily being in direct contact with the user's skin.

Said arrangements further include a processing unit capable of deriving, based on the electrical signals generated, corresponding biometric information of the user.

By appropriately placing the sensors—for example at the position of the heart and/or of the respiratory system—it is possible to effectively monitor the physical state of a user.

Arrangements of the type described above are disclosed, for example, in documents U.S. Pat. No. 10,034,631, DE 202012001096 U and WO 2015/127193.

The arrangements described in these documents, although articulated and capable of detecting a large number of different biometric parameters, are not without drawbacks.

In particular, the presence of piezoelectric sensors makes the construction of the vehicle seat complex, and the positioning of these sensors and the relative connection and power supply elements involves considerably longer assembly times.

There is also an increase in the overall weight of the vehicle. While this weight increase may seem small at first glance, it is well known that minimizing the weight of seats—as well as of the other components in the vehicle cockpit—is one of the main objectives in the automotive sector.

In addition, the need to provide these sensors, their connections and corresponding batteries or similar power supply elements imposes constraints on the manufacturer's freedom in the design of the seat.

All these drawbacks are amplified by the fact that reliable and precise monitoring of the user's biometric data requires a large number of sensors.

The main object of the present invention is to overcome the limitations of the prior art, by providing a solution for the detection and monitoring of the biometric data of a user occupying a vehicle seat that does not adversely affect the complexity of the production process, and production time of the seat and its overall weight.

These and other objects are achieved with a vehicle seat cover and a vehicle seat as claimed in the appended claims.

SUMMARY OF THE INVENTION

The invention provides a smart cover for a vehicle seat, said smart cover being made of one or more fabrics, wherein one or more yarns of at least one of said fabrics are made as sensors, and wherein one or more yarns of at least one of said fabrics are made as supercapacitors, said yarn supercapacitors being electrically connected to said yarn sensors.

Thanks to the invention, energy can be stored in the yarn supercapacitors of the cover according to the invention and can then be released for supplying power to the yarn sensors of the cover.

As a result, in the invention the arrangement for the detection of biometric data of the user is integrated in the cover of the vehicle seat.

The manufacturing times for the cover are the same as those for a conventional cover, as both the yarn sensors and the yarn supercapacitors are integrated in the cover by using a conventional weaving process.

The weight of the cover is also substantially the same, as the difference in weight between the yarn sensors and the yarn supercapacitors of said cover and the yarns used in a conventional cover is absolutely negligible.

In addition, since both the yarn sensors and the yarn supercapacitors are integrated into one or more fabrics that form the cover, there is no risk that the sensor elements will shift during use and be in a position in which their effectiveness is reduced.

It is worth pointing out that the cover, according to the invention, is radically different from a cover that undergoes surface treatments at the end of the production process. Over time, a fabric that has undergone surface treatments can lose the properties imparted by the treatment due to abrasion; this would be particularly serious in the case of fabrics used to make vehicle seat covers, as these are highly subject to abrasion. On the other hand, since the cover according to the invention comprises both yarns that are intrinsically capable of acting as sensors and yarns that are intrinsically capable of acting as supercapacitors, its operation does not deteriorate over time.

The electronics needed for the management of the power supply of the yarn sensors by the yarn supercapacitors will also be associated with the cover according to the invention.

The data detected by the yarn sensors can be sent to a control unit for being interpreted and translated into biometric data of the user's physical state.

These biometric data may include, for example, heart rate, blood pressure, breathing rate, body temperature and so on.

The yarn sensors of the cover according to the invention are preferably pressure and/or temperature sensors.

The yarn sensors of the cover according to the invention are preferably piezoresistive sensors.

In an embodiment of the invention, the yarn sensors and the yarn supercapacitors are arranged in the same fabric or in the same region (square patch) of fabric.

In another embodiment of the invention, the yarn sensors and the yarn supercapacitors are arranged in different fabrics or in different regions (square patches) of fabric.

According to the latter embodiment, it is possible to arrange the yarn sensors and the yarn supercapacitors in different positions in the cover.

In particular, it will be possible to arrange the yarn sensors in positions where they are in contact with the body of a user occupying the seat and can exert their action effectively. These positions can be identified in the cushion portion, backrest portion, headrest portion, armrest portion and so on.

On the other hand, the yarn supercapacitors can be arranged in different positions, for example in positions that are not in contact with the body of a user occupying the seat.

The yarn sensors of the cover according to the invention can be used as weft yarns, warp yarns, or both.

The yarn supercapacitors of the cover according to the invention can be used as weft yarns, warp yarns, or both.

According to a preferred embodiment of the invention, the yarn sensors are made from a bundle of electrically conductive polymer nanofibers.

According to a particularly preferred embodiment of the invention, the yarn sensors are made from a bundle of electrically conductive, piezoresistive polymer nanofibers.

According to a preferred embodiment of the invention, the yarn supercapacitors are made from carbon fiber electrodes or carbon nanotubes.

According to a particularly preferred embodiment of the invention, at least one of said electrodes or both said electrodes is/are suitably treated by passive coating with active materials, or by electrochemical activation to introduce porosity and functional groups, or by electrodeposition.

The invention further relates to a seat comprising the smart cover described above.

Said seat advantageously comprises the electronics needed for the management of the power supply of the yarn sensors by the yarn supercapacitors.

In a preferred embodiment of the invention, the seat is provided with an electronic control unit, made as a rigid or flexible printed circuit board. This circuit is responsible for powering the yarn sensors by exploiting the voltage obtained from the yarn supercapacitors.

In addition, the electronic control unit integrated in the seat according to the invention contains a circuit portion that will analyze the electrical data from the sensors for interpreting them from a biometric viewpoint, thus providing information on the user's biometric data (heart rate, blood pressure, breathing rate, body temperature, . . . ).

Said electronic control unit may further be provided with a circuit portion responsible for the wireless transmission of the biometric data to a remote transceiver (provided, for example, in the vehicle dashboard).

Preferably, the seat according to the invention further comprises elements for energy harvesting, which will then be stored in the yarn supercapacitors of the cover.

In a preferred embodiment of the invention, said energy harvesting elements are solar cells, arranged in portions of the seat that are usually exposed to solar radiation.

Correspondingly, the electronic control unit also includes a circuit portion responsible for the energy harvesting (for example, solar cells) and the transfer of energy from said energy harvesting elements to the yarn supercapacitors of the cover.

BRIEF DESCRIPTION OF THE DRAWINGS

Further features and advantages of the invention will become more apparent from the ensuing detailed description of a preferred embodiment thereof, given by way of non-limiting example, with reference to the annexed figures, in which.

DETAILED DESCRIPTION OF A PREFERRED EMBODIMENT OF THE INVENTION

Figure 1:
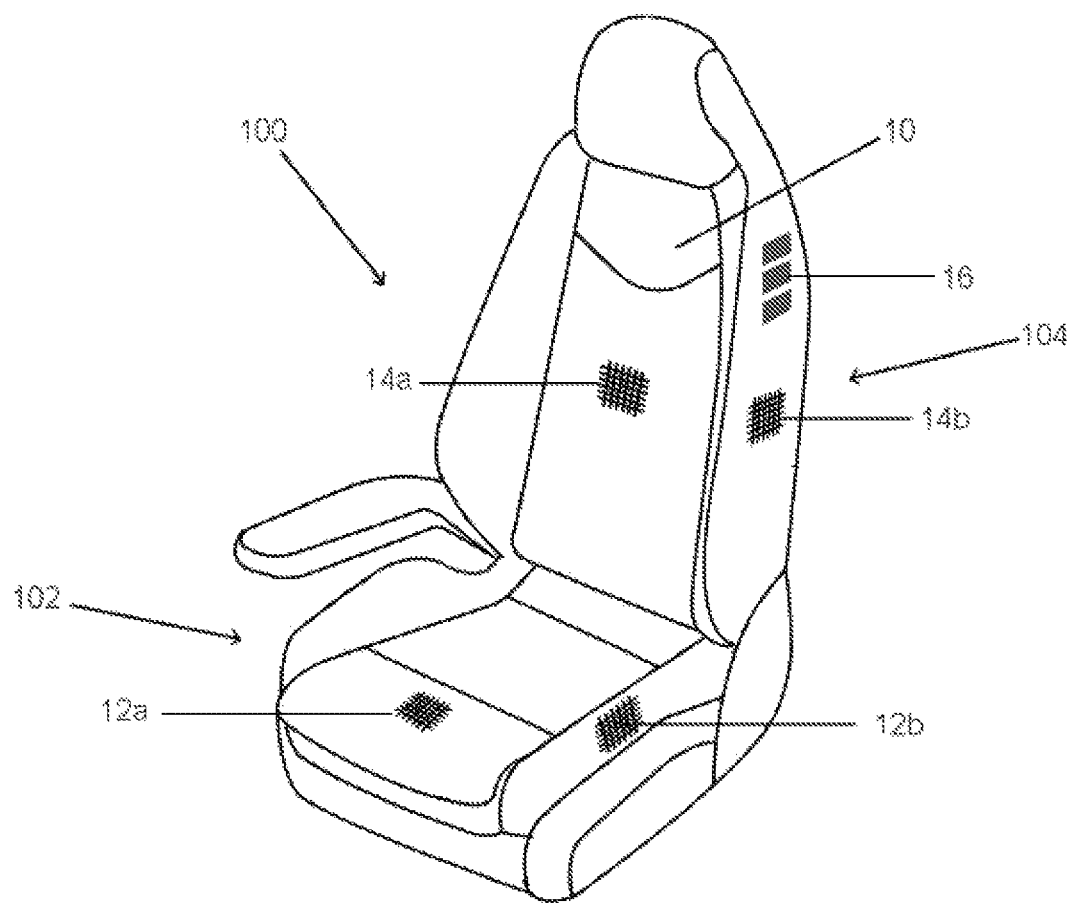
FIG. 1 schematically shows a vehicle seat according to the invention.

Referring to FIG. 1, there is illustrated a vehicle seat 100 according to the invention.

In a manner known per se, the vehicle seat 100 comprises a cushion 102 and a backrest 104. Said vehicle seat 100 may further comprise additional accessory elements, such as a headrest, one or two armrests, and so on.

Again in a manner known per se, the vehicle seat 100 comprises a frame (for example, made of metals, alloys or composite materials), on which a padding is mounted.

A cover 10 is fitted over the padding and covers the cushion 102 and the backrest 104.

If accessory elements (headrest, armrest, etc.) are provided, each of them may in turn include a frame, a padding mounted on said frame and a cover fitted over said padding.

Generally, the cover 10 can be made of a single fabric, or of several different fabrics.

In the case of a cover made of several different fabrics, said fabrics could be obtained from different materials (polyester, thermoplastic polyurethane, polyacrylonitrile, etc.), or they could be obtained from the same kind of material but having different quality, or they could be obtained from the same material and then subjected to different treatments, so that final fabrics with different properties are obtained.

Advantageously, in the case of a cover made of different fabrics, fabrics with different features can be used for manufacturing different portions of the cover.

According to the invention, at least one of the fabrics forming the cover 10 comprises one or more yarn sensors and at least one of the fabrics forming said cover comprises one or more yarn supercapacitors, said yarn supercapacitors being electrically connected to said yarn sensors.

The yarn sensors are preferably made as pressure and/or temperature sensors.

The yarn sensors are preferably made as piezoresistive sensors.

In the embodiment of FIG. 1, the yarn sensors and the yarn supercapacitors are arranged in different fabrics of the cover 10, or in different regions of one and the same fabric of the cover 10.

In particular, with reference to FIG. 1, first yarn sensors are used as yarns for manufacturing the fabric of the cover 10 at a first fabric region 12a and at the cushion 102 of the seat 100; and first yarn supercapacitors are used as yarns for manufacturing the fabric of the cover 10 at a second fabric region 12b, again at the cushion 102 of the seat 100, but distant from the first fabric region 12a.

Similarly, second yarn sensors are used for manufacturing the fabric of the cover 10 at a third fabric region 14a at the backrest 104 of the seat 100 and second yarn supercapacitors are used for manufacturing the fabric of the cover 10 at a fourth fabric region 14b, again at the backrest 104 of the seat 100, but distant from the third fabric region 14a.

The first yarn sensors are electrically connected to the first yarn supercapacitors and the second yarn sensors are electrically connected to the second yarn supercapacitors.

Advantageously, the first yarn sensors are arranged in a first fabric region 12a that is in contact with the body of the user when he/she is sitting on the seat 100. Said first fabric region 12a may, for example, be provided on the upper face of the cushion 102, in a substantially central position.

In this way, they can effectively detect pressure and/or temperature variations induced by physiological factors of the user.

On the other hand, the yarn supercapacitors may be arranged in a second fabric region 12b that is barely susceptible to rubbing and abrasion, such as, for example, one of the side faces of the cushion 102.

Similarly, the second yarn sensors are arranged in a third fabric region 14a that is in contact with the body of the user when he/she is sitting on the seat 100. Said third fabric region 14a may, for example, be provided on the front face of the backrest 104; preferably, said third fabric region 14a is arranged at the heart and/or lungs of a user occupying the vehicle seat 100.

In this way, they can effectively detect pressure and/or temperature variations induced by physiological factors of the user.

On the other hand, the second yarn supercapacitors may be arranged in a second fabric region 14b that is barely susceptible to rubbing and abrasion, such as, for example, one of the side faces of the backrest 104 or the rear face of the backrest 104.

This embodiment should not be understood in a limiting sense, and yarn sensors and yarn supercapacitors can be provided in the same fabric region of the cover 10.

The yarn sensors can be weft yarns of the fabric of the cover 10, warp yarns of said fabric, or also a combination of weft yarns and warp yarns of said fabric.

The yarn sensors are combined with conventional yarns, preferably made of polyester or other appropriate material, for manufacturing the fabric, in order to obtain continuous yarns suitable for the manufacture of the cover.

Said sensor yarns can be made as sensors over their entire length, or they can be made as sensors only in certain segments, alternating with neutral segments.

The yarn supercapacitors can be weft yarns of the fabric of the cover 10, warp yarns of said fabric, or also a combination of weft yarns and warp yarns of said fabric.

The yarn supercapacitors are combined with conventional yarns, preferably made of polyester or other appropriate material, for manufacturing the fabric, in order to obtain continuous yarns suitable for the manufacture of the cover.

The yarn sensors are pressure and/or temperature sensors that, exploiting the piezoresistive transduction principle, can be used for monitoring the biometric parameters (heart rate, blood pressure, breathing rate, etc.) of the user occupying the seat, so that information about the state of concentration and tiredness of the user are obtained.

The yarn sensors are preferably made by means of bundles of polymer nanofibers. They can be obtained with the electrospinning technique.

Said polymer nanofibers can be developed starting from:
highly deformable and intrinsically conductive polymers;
polymer nanocomposites containing carbon-based nanoparticles;
carbon-based nanofibers obtained by oxidation and subsequent carbonization of polyacrylonitrile nanofibers.

It will be evident to the person skilled in the art that also other suitable raw materials can be provided for the realization of these polymer nanofibers.

Polymer nanofibers represent the active element of the sensor, as they are able to transduce the mechanical deformations induced by variations in temperature and/or external pressure (caused by heartbeat, blood pressure, etc.) into electrical signals. In particular, these signals can be ascribed to the piezoresistive property of nanofibers.

The yarn supercapacitors are preferably made from electrodes based on carbon fibers and carbon nanotubes.

In a preferred embodiment of the invention, at least one of said electrodes, or both said electrodes is/are suitably treated by passive coating with active materials, or by electrochemical activation to introduce porosity and functional groups, or by electrodeposition.

Both yarn electrodes, at least one of which has been suitably treated, are covered with a solid electrolyte polymer by means of an electropolymerization or impregnation process.

The two yarn electrodes are then coupled/twisted to form the yarn supercapacitor.

The yarn supercapacitors represent an eco-friendly alternative to the use of lithium batteries with lower power density values, limited number of charge/discharge cycles, and safety and disposal problems.

Thanks to the invention, energy can be stored in the yarn supercapacitors according to the invention and can then be released for supplying power to the yarn sensors, and possibly other low power electronic devices inside the vehicle cockpit.

Accordingly, the invention allows obtaining an arrangement for the detection of the user's biometric data that is integrated in the cover 10 of the vehicle seat 100.

Preferably, said detection arrangement is completely autonomous and for this purpose the seat 100 also comprises elements for energy harvesting, which will then be stored in the yarn supercapacitors of the cover 10.

Said energy harvesting elements may be, for example, solar cells 16 to be arranged at portions of the seat that are exposed to solar radiation. Such cells are electrically connected to yarn supercapacitors of the cover 10.

As an alternative, the yarn supercapacitors of the cover 10 could be connected to an outer energy source.

Figure 2:
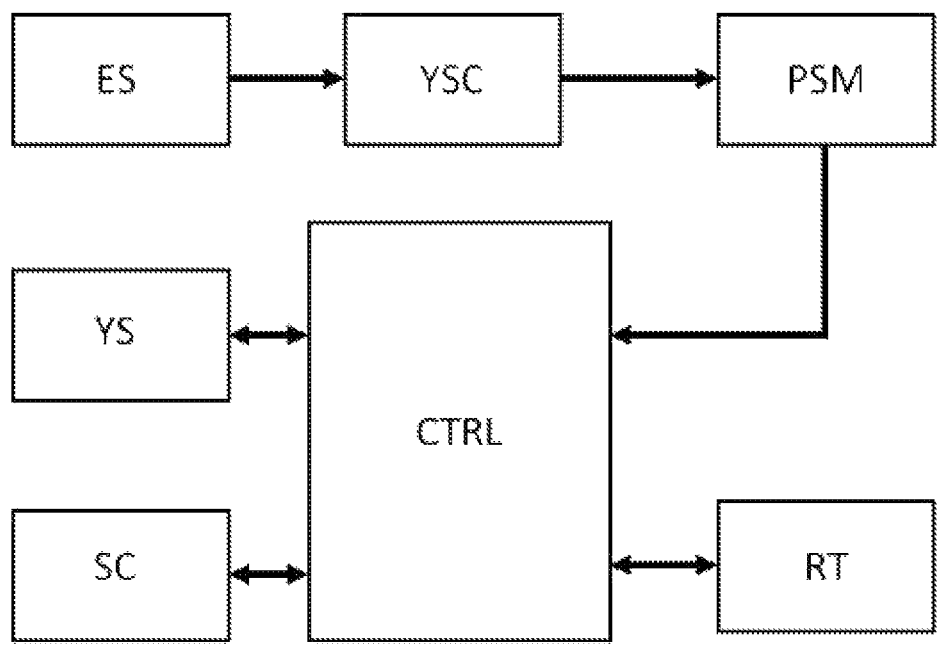
FIG. 2 shows the diagram of operation of the biometric data detection arrangement integrated in the cover of the vehicle seat of FIG. 1.

In FIG. 2 there is schematically illustrated, in the form of a block diagram, the principle of operation of the biometric data detection arrangement of the seat 100 of FIG. 1.

An energy source ES transfers energy to the yarn supercapacitors YSC, which can store said energy.

Said energy source, for example, may consist of solar cells, equipped with a circuit block containing all the electronics necessary for their operation.

Said energy can then be used by the yarn sensors YS for detecting pressure and/or temperature variations induced by the user occupying the vehicle seat.

In particular, it is possible to provide a control module PSM, which, when receiving an input voltage from the supercapacitors, provides back a fixed output voltage that acts as supply voltage for the microcontroller (indicated by CTRL in FIG. 2), which controls the yarn sensors, as well as for said yarn sensors.

The electronics of the biometric data detection arrangement further comprises a dedicated electronics for the signal conditioning SC, which analyzes the signals from the yarn sensor and evaluates the biometric aspect thereof, and the signal transmission RT, for example transmission to a device provided in the vehicle cockpit.

The signal coming from the yarn sensors YS and relating to a pressure and/or temperature variation, can be analyzed and processed by the electronic control unit (microcontroller CTRL). The data thus analyzed and processed are transmitted by means of the module for signal transmission RT to a remote device, for example, a device provided in the vehicle dashboard and connected to the on-board computer as well as to a visual display unit.

The description of the preferred embodiment provided herein must be understood merely in an exemplary, non-limiting manner and numerous changes and modifications within the knowledge of the person skilled in the art are possible without departing from the scope of protection as defined by the appended claims.

The invention claimed is:

1. A vehicle seat cover made of one or more fabrics, wherein at least one of the one or more fabrics forming the vehicle seat cover comprises one or more yarn sensors, and at least one of the one or more fabrics forming the vehicle seat cover comprises one or more yarn supercapacitors, the yarn supercapacitors being electrically connected to the yarn sensors.

2. The vehicle seat cover according to claim 1, wherein the yarn sensors are made as pressure or temperature sensors.

3. The vehicle seat cover according to claim 2, wherein the yarn sensors are made as piezoresistive sensors.

4. The vehicle seat cover according to claim 3, wherein the yarn sensors are made from electrically conductive polymer nanofibers.

5. The vehicle seat cover according to claim 1, wherein the yarn supercapacitors are made from electrodes based on carbon fibers and carbon nanotubes.

6. The vehicle seat cover according to claim 5, wherein at least one of the electrodes is suitably treated by a method selected from the group consisting of passive coating with active materials, electrochemical activation to introduce porosity and functional groups, and electrodeposition.

7. The vehicle seat cover according to claim 6, wherein the electrodes are coated with a solid electrolyte polymer.

8. The vehicle seat cover according to claim 5, wherein the electrodes are suitably treated by a method selected from the group consisting of passive coating with active materials, electrochemical activation to introduce porosity and functional groups, and electrodeposition.

9. The vehicle seat cover according to claim 8, wherein the electrodes are coated with a solid electrolyte polymer.

10. The vehicle seat cover according to claim 1, wherein the yarn sensors and the yarn supercapacitors are arranged in different fabrics of the vehicle seat cover.

11. The vehicle seat cover according to claim 1, wherein the yarn sensors are weft yarns of the fabric of the vehicle seat cover.

12. The vehicle seat cover according to claim 1, wherein the yarn supercapacitors are weft yarns of the fabric of the vehicle seat cover.

13. The vehicle seat cover according to claim 1, wherein the yarn superconductors supply power to the yarn sensors, and wherein the vehicle seat cover further comprises a control electronics for managing the power supply of the yarn sensors by the yarn supercapacitors.

14. The vehicle seat cover according to claim 1, wherein the yarn sensors are made as piezoresistive sensors.

15. The vehicle seat cover according to claim 14, wherein the yarn sensors are made from electrically conductive polymer nanofibers.

16. The vehicle seat cover according to claim 1, wherein the yarn sensors and the yarn supercapacitors are arranged in different regions of one and the same fabric of the vehicle seat cover.

17. The vehicle seat cover according to claim 1, wherein the yarn sensors are warp yarns of the fabric of the vehicle seat cover.

18. The vehicle seat cover according to claim 1, wherein the yarn sensors are a combination of weft yarns and warp yarns of the fabric of the vehicle seat cover.

19. The vehicle seat cover according to claim 1, wherein the yarn supercapacitors are warp yarns of the fabric of the vehicle seat cover.

20. The vehicle seat cover according to claim 1, wherein the yarn supercapacitors are a combination of weft yarns and warp yarns of the fabric of the vehicle seat cover.

* * * * *